R. H. RICHMOND.
DRIVING CHAIN.
APPLICATION FILED APR. 26, 1911.
1,027,002.
Patented May 21, 1912.
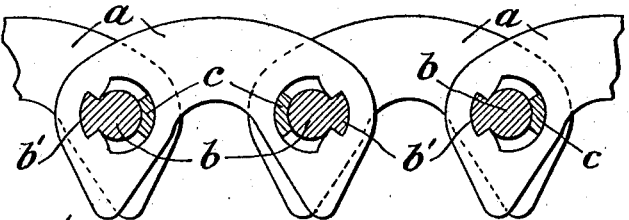
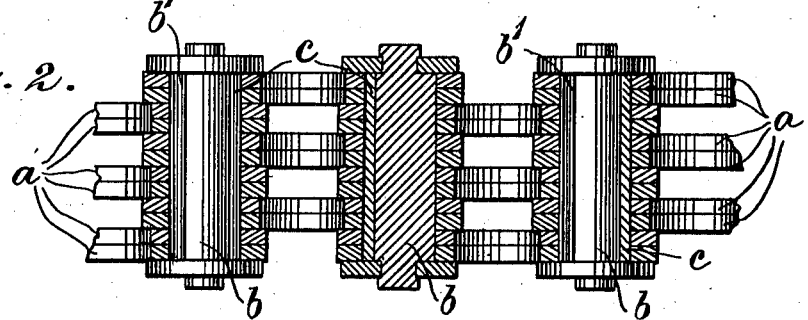
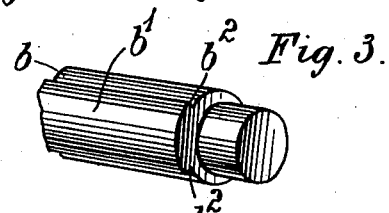
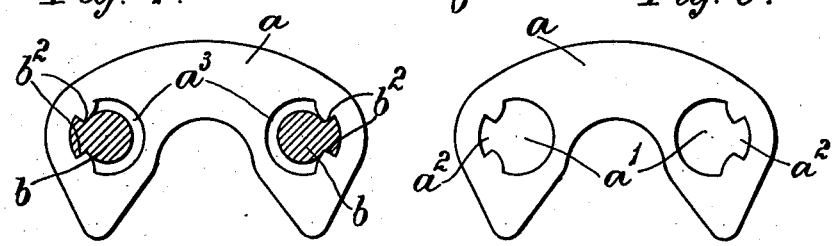
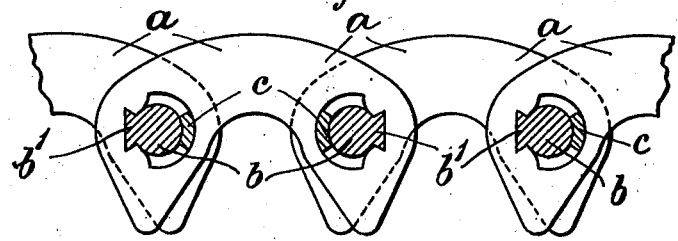
WITNESSES:
INVENTOR,
REGINALD HERBERT RICHMOND,
by
Attorney.
COLUMBIA PLANOGRAPH CO., WASHINGTON, D. C.

UNITED STATES PATENT OFFICE.

REGINALD HERBERT RICHMOND, OF BIRMINGHAM, ENGLAND, ASSIGNOR OF ONE-HALF TO BRAMPTON BROTHERS LIMITED, OF BIRMINGHAM, ENGLAND.

DRIVING-CHAIN.

1,027,002. Specification of Letters Patent. Patented May 21, 1912.

Application filed April 26, 1911. Serial No. 623,423.

*To all whom it may concern:*

Be it known that I, REGINALD HERBERT RICHMOND, subject of the King of Great Britain, residing at Oliver Street Works, Birmingham, in the county of Warwick, England, have invented a new and useful Improvement in Driving-Chains; and I do hereby declare the following to be a full, clear, and exact description of the same.

My invention comprises improvements in driving chains for motor vehicles and other purposes and refers to that class of such chains which consist of a plurality of thin links placed side by side and having at each end beneath the pintle openings depending teeth which engage with the walls or faces of the sprocket teeth. Heretofore it has been proposed in a chain of this type to provide the links of such a chain with two segmental bushings arranged on either side of the pintle, each bushing being carried in, and controlled by, one series of link elements, the next series of link elements having bush openings to allow relative movement of the bush segments therein. In this chain the pintle is quite free and when the chain is bent the pintle merely moves with that "link" with which it has the greater friction. It has also been proposed to employ in a similar chain, a single bushing carried by, and controlled by one series of link elements in combination with a pintle having an outwardly tapering rib which engages a corresponding recess in the other series of link elements in such manner that the said pintle is caused to move with the link elements; but the projecting rib on said pintles have been of such a size and shape that when the chain has been subjected to heavy wear the pintles on the slack side of the chain are liable to become displaced and the rib to leave its recess with disastrous results to the chain. Now by my invention I provide an improved chain of the specified type in which these defects are overcome.

According to my invention, in a chain of the type in which each link comprises a series of thin link elements, I employ in combination a pintle having a longitudinal rib engaging one series of link elements, and in contact with said pintle a single segmental bushing carried in, and controlled by, the other series of link elements, the projection on the pintle being so arranged as to prevent the pintle being drawn out of its place into the bush opening or recess in the bush.

Referring to the drawings:—Figure 1. is a longitudinal section through a driving chain constructed according to my invention. Fig. 2. is an inverted sectional plan of same. Fig. 3. is a perspective view of the pintle removed and Fig. 4. is a side view of one link element with the pintle in position therein. Fig. 5. shows a single link element removed. Fig. 6. is a similar view to Fig. 1 showing a modified shape of pintle.

As shown upon the accompanying drawings, the links consist of a series of thin link elements $a$, each of which is pierced at $a^1$ to receive the pintle $b$. The pintle $b$ has a longitudinal rib $b^1$ and at the ends of the link elements each opening $a^1$ has an enlargement $a^2$ to receive either the rib $b^1$ or segmental bushing $c$, while on the inner sides respectively each opening $a^1$ has a greater enlargement or recess $a^3$ to allow the rib or bushing to freely move therein. The sides $b^2$ of the rib converge toward the pintle so that said pintle can not be drawn toward the middle of the link and into the enlargement $a^3$; the pintle being keyed to the link elements. At each end of a link there is a pintle with its rib or a bush segment, and obviously when the chain is bent the pintle moves with the link by which it is controlled, while the bush segment correspondingly moves with the link whereby it is carried.

What I claim then is:—

In a driving chain the combination of two series of alternately placed link elements each link element having a hole near each end thereof, each of said holes having a small expanding enlargement on the side adjacent to the respective link extremity, and a greater opening on the inner side; pintle pins passing through both series of link elements for the full width of the chain and pivotally uniting said link elements, said pintle pins having a longitudinal rib of outwardly expanding or dovetail shape corresponding with that of the smaller hole enlargement in one series of said link elements into which said rib fits in such manner that it is restrained against radial movement toward the major part of the hole, but caused to move angularly with the link elements; and a segmental bushing fitting within the smaller enlargement in the holes in the other series of link elements with which said bushing is caused to move, and passing through both series of link elements, and downward projections being provided on the link elements for engaging the sprocket teeth; for the purpose specified and set forth.

In testimony whereof, I have signed my name to this specification in the presence of two subscribing witnesses.

REGINALD HERBERT RICHMOND.

Witnesses:
 HAROLD J. C. FORRESTER,
 NORMAN S. BARLOW.

Copies of this patent may be obtained for five cents each, by addressing the "Commissioner of Patents, Washington, D. C."